United States Patent
Biddle et al.

[11] Patent Number: 5,979,218
[45] Date of Patent: Nov. 9, 1999

[54] STRUT MOUNT TRANSDUCER

[75] Inventors: Thomas E. Biddle, Clinton Township; Kenneth R. Waryas, Utica, both of Mich.

[73] Assignee: Chrysler Corporation, Auburn Hills, Mich.

[21] Appl. No.: 08/967,953

[22] Filed: Nov. 12, 1997

[51] Int. Cl.⁶ .................................................. G01M 17/04
[52] U.S. Cl. ............. 73/11.04; 280/5.515; 280/124.147; 280/124.155
[58] Field of Search ................................ 73/11.04, 118.1; 280/86.752, 124.146, 124.147, 124.148, 124.154, 124.155, 5.515; 701/37

[56] References Cited

U.S. PATENT DOCUMENTS

| | | | |
|---|---|---|---|
| 4,666,180 | 5/1987 | Shirakuma | 280/707 |
| 4,800,751 | 1/1989 | Kobayashi et al. | 73/118.1 |
| 4,809,179 | 2/1989 | Klinger et al. | 280/707 |
| 4,817,984 | 4/1989 | Ferman et al. | 280/668 |
| 4,982,609 | 1/1991 | Talley, III | 73/849 |
| 5,086,649 | 2/1992 | Yamaoka | 73/118.1 |
| 5,150,917 | 9/1992 | Kawabata | 280/707 |
| 5,186,042 | 2/1993 | Miyazaki | 73/118.1 |
| 5,226,635 | 7/1993 | Nakamura | 73/118.1 |
| 5,269,558 | 12/1993 | Yoshioka et al. | 280/707 |
| 5,324,069 | 6/1994 | Ogawa | 280/707 |
| 5,338,055 | 8/1994 | Mauz | 280/668 |
| 5,428,533 | 6/1995 | Ogawa | 280/707 |
| 5,619,413 | 4/1997 | Oakley | 280/707 |

*Primary Examiner*—Eric S. McCall
*Attorney, Agent, or Firm*—James R. Yee

[57] ABSTRACT

A force transducer for measuring loads imparted to the suspension of a vehicle is provided. The force transducer comprises a hub having an aperture for receiving a first component of the suspension, a seat connected to the hub for receiving a second component of the suspension, an outer ring having a plurality of arms that connect the outer ring to the hub, and a plurality of strain gauges connected to the plurality of arms that produce a signal that is proportional to the strain seen in each of the arms, thereby allowing a measurement of load elements imparted to the suspension of the vehicle.

12 Claims, 3 Drawing Sheets

STRUT MOUNT TRANSDUCER

BACKGROUND OF THE INVENTION

1. Field of the Invention

The present invention relates generally to an apparatus and method for measuring vertical loads imparted to components of an automotive vehicle and, more particularly, to a strut mount transducer for measuring spring, shock absorber and jounce bumper loads presented to a vehicle suspension.

2. Discussion

During the development of a new automobile, it is advantageous to accurately analyze the energy imparted to the vehicle from the suspension system. The need exists, early in the automobile design sequence, to determine the loads which will be endured by specific components of the vehicle suspension and its supporting structure. Once these loads have been identified, material thickness and composition may be appropriately selected in order to provide suspension parts with adequate fatigue strength to meet the associated stress limits.

Force transducers or load cells have been used to measure these loads. These transducers generally provide an electrical signal that is directly proportional to the force presented. This allows for the generation and storage of data that may be subsequently analyzed.

One type of suspension with which transducers have been used is the MacPherson strut suspension, which is well known and which combines the spring, upper suspension locator or jounce bumper, and shock absorber, into a single assembly. This type of suspension is shown in FIG. 1, in which only the pertinent components are labeled. Vehicle 10 receives MacPherson strut assembly 12. The three significant components of the assembly include spring 13, jounce bumper 14, and strut 16. Strut mount cover 18 covers strut mount 20, which is held in place in front suspension shock tower 22 via bolts 24. Bumper 14 abuts a recess in shock tower 22. Spring 13 is disposed around bumper 14 and is also retained in shock tower 20, as is strut 16, which passes through the spring and the bumper.

In order to effectively analyze the loads present in such a suspension. There is a need to provide a force transducer which simultaneously measures the spring load (A), strut load (B), and jounce bumper load (C) present in this assembly.

It is therefore an objective of the present invention to provide a transducer that simultaneously measures spring load, strut load, and jounce bumper load.

It is a related objective of the present invention to provide a transducer that can be attached on the strut mount of a MacPherson type suspension.

SUMMARY OF THE INVENTION

In order to achieve the foregoing objectives, a force transducer for measuring loads imparted from the suspension of a vehicle is provided. The force transducer comprises a hub having an aperture for receiving a first component of the suspension, a seat connected to the hub for receiving second and third components of the suspension, an outer ring having a plurality of arms that connect the outer ring to the hub, a plurality of strain gauges operatively connected to the plurality of arms that produce a signal that is proportional to the force imparted to the suspension of the vehicle, and an associated electric circuit for processing the signal. The transducer replaces the strut mount in a MacPherson type front suspension and replaces the strut mount cover.

BRIEF DESCRIPTION OF THE DRAWINGS

Other objects and advantages of the invention will become apparent upon reading the following detailed description and upon reference to the following drawings, in which.

DESCRIPTION OF THE PREFERRED EMBODIMENTS

Figure 1:
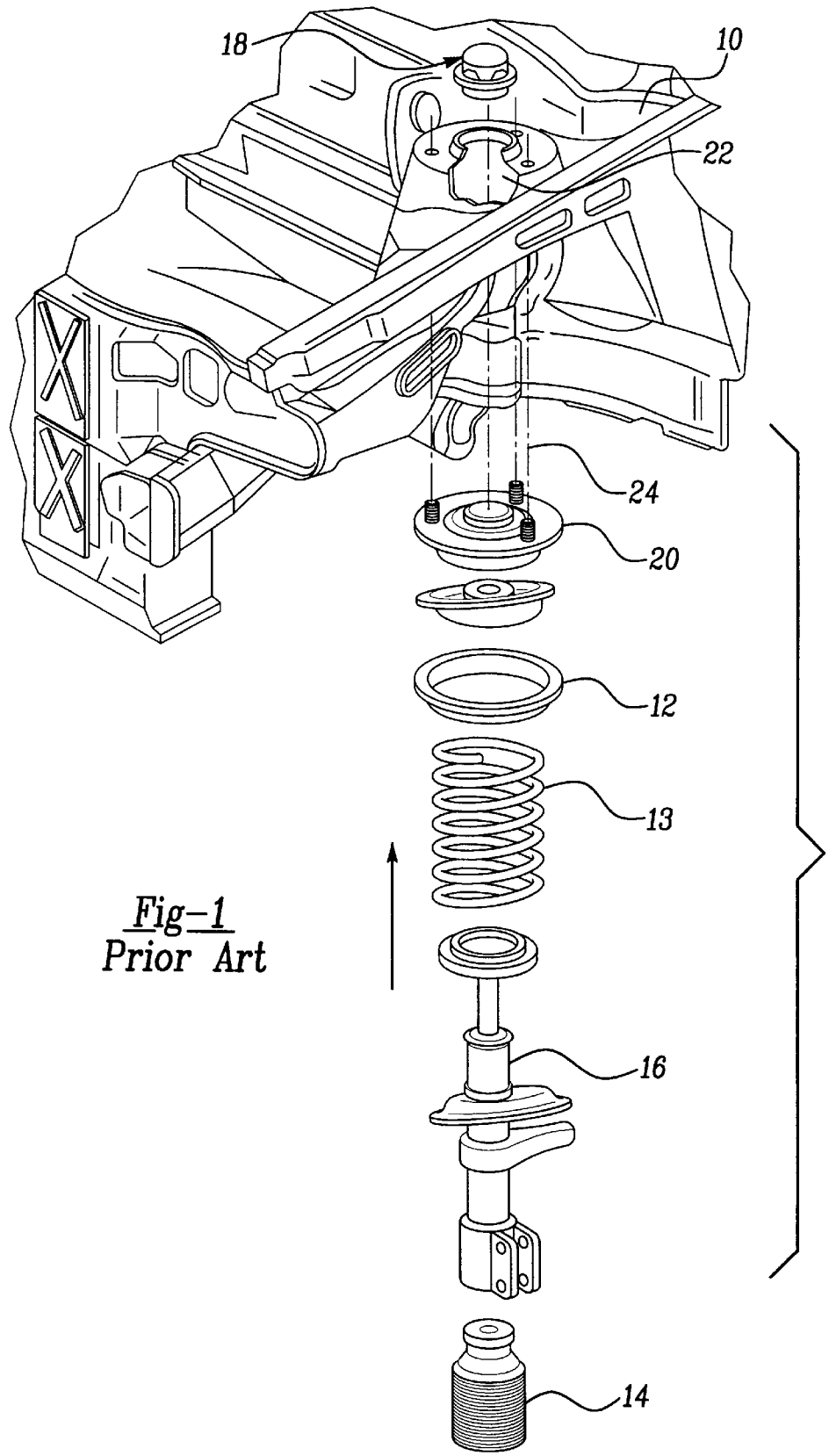
FIG. 1 is an exploded partially cut-away perspective view of a typical MacPherson strut suspension.
Figure 2:
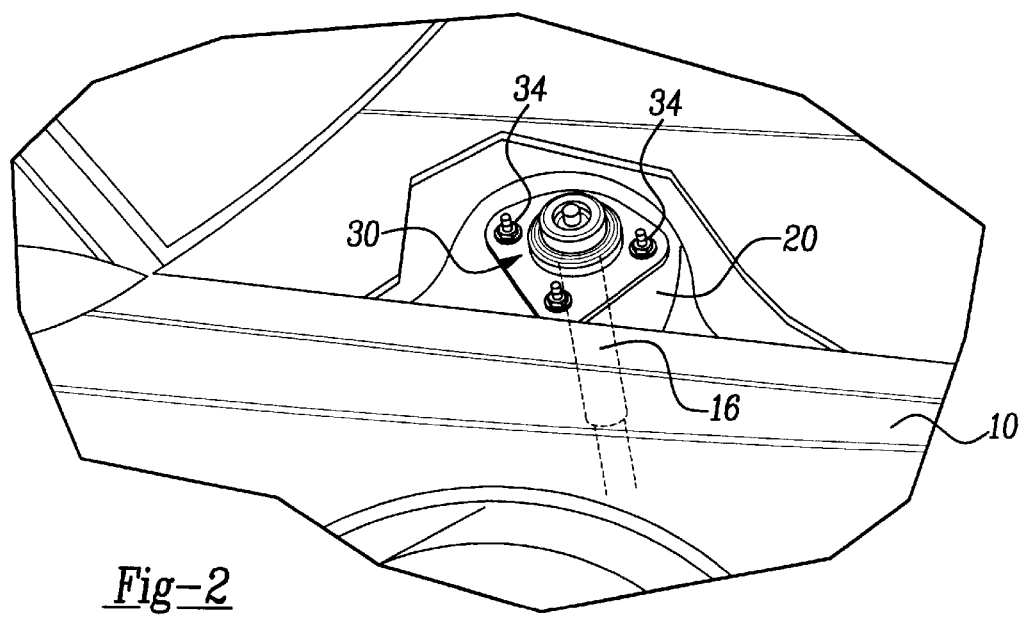
FIG. 2 is a fragmentary perspective view of a front suspension shock tower having the upper strut mount transducer of the preferred embodiment of the present invention.
Figure 3:
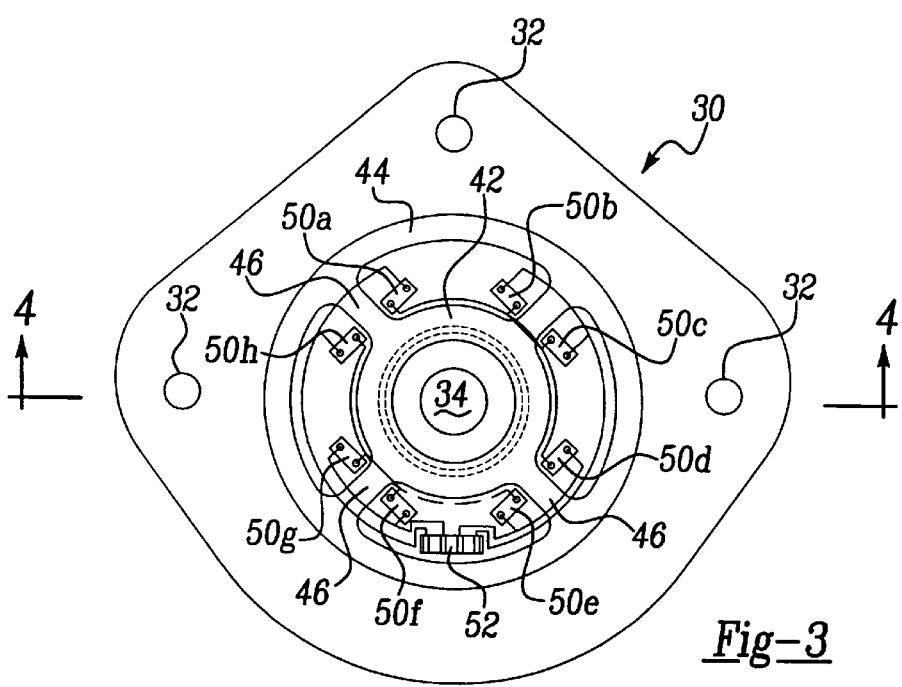
FIG. 3 is top view of the upper strut mount transducer of the preferred embodiment of the present invention.

Turning first to FIG. 2, strut transducer 30 according to the teachings of the preferred embodiment of the present invention can be seen. The strut transducer 30 is designed to replace the strut mount and strut mount cover and bolts to the shock tower 20 of the vehicle body 10 via bolts 34. In the preferred embodiment, the transducer 30 is machined from a solid piece of Vega A6 tool steel, a high strength steel necessary to prevent yielding during use of the transducer. Any appropriate material may be used, however. As can be seen in FIG. 3, mounting holes 32 are provided in the strut transducer 30 and correspond to holes bored in the shock tower to receive bolts 34, which allow strut mount transducer 30 to be securely fastened to the body of the shock tower 20.

Figure 4:
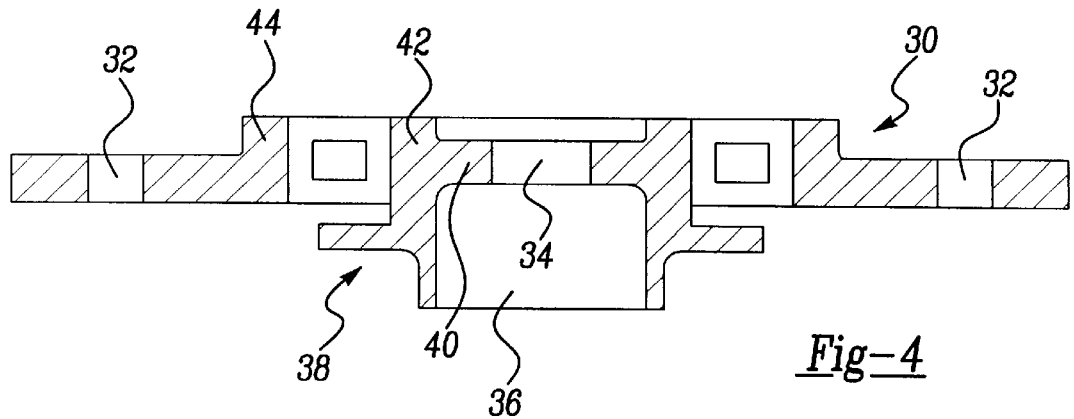
FIG. 4 is a cross-sectional view of the upper strut mount transducer of the preferred embodiment of the present invention taken along lines 44 of FIG. 3.

As seen in FIG. 4, transducer 30 is configured to receive the strut 16, spring 13, and jounce bumper 14 via hub 42. The upper end of the strut 16 is received by center hole 34 and recess 36. The spring 13 is received by circumferential seat 38. The jounce bumper 14 abuts circumferential ledge 40 of recess 36. This configuration allows the three loads to be transmitted into the center of the hub 42 to be measured as discussed below.

Referring to FIG. 3, hub 42 is connected to outer ring 44 via a plurality of arms 46, in the preferred embodiment shown of which there are four. The forces received by the hub 42 are transmitted across the four arms to the outer ring 44, and, in the process, the forces are measured via a series of strain gauges forming an electric circuit disposed between the hub and the outer ring. In the preferred embodiment shown, eight strain gauges 50a–50h are mounted within the hub 42 preferably by baking them to suitable locations on the hub structure. In the preferred embodiment shown, four of these strain gauges take compressive loads (50a, 50c, 50e, 50g) and four take tensile loads (50b, 50d, 50f, 50h). As forces are transmitted from the hub 42 to the outer ring 44, they are transmitted through the strain gauges 20 and produce a corresponding electrical signal that is directly proportional to the strain seen in each, and in turn proportional to the forces imparted from the suspension.

Figure 5:
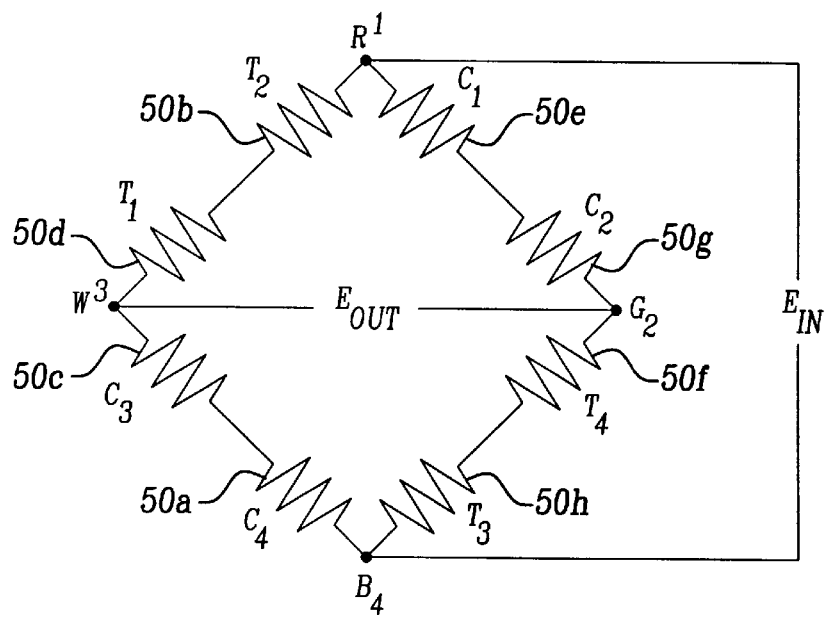
FIG. 5 is a schematic view of an electric circuit of the preferred embodiment.

The output of the eight strain gauges 20 is processed via a suitable processing circuit, such as the Wheatstone Bridge circuit seen in FIG. 5. In FIG. 5, the strain gauges are schematically shown as resistive elements. The signal is then extracted via connector 52 and sent to processing equipment.

Prior to testing, a calibration curve (strain gauge voltage (volts) vs. force (lbs/in$^2$)) is generated from which the output signal may be converted to force. This calibration curve is generated with a test apparatus that applies a known load to the hub 42 and records the voltage that is produced by the strain gauges 50 for the known application of force. This application of a known load is repeated with various magnitudes of force applied to the hub 42. From this repetitive application and measurement, the calibration curve may be generated and subsequently used to convert a strain gauge voltage to a force value.

From the foregoing, it can be seen that the present invention provides an apparatus and methodology by which an effective analysis of the vertical loads presented to a vehicle may be conducted. The invention presents a means by which the spring load, strut load, and jounce bumper load may be simultaneously summed and reviewed in order to identify these stress limits by which material thickness and composition may be appropriately selected in order to provide suspension parts with adequate fatigue strength.

While the principles of the invention in connection with the specific apparatus and methodology have been described, it is to be understood that the foregoing detailed description has been made by way of example only and not as a limitation to the scope of the invention as set forth in the accompanying claims.

We claim:

1. A force transducer for measuring loads imparted to the suspension of a vehicle, comprising:

a hub having a means for receiving first, second and third components of the suspension;

an outer ring having a plurality of arms that connect the outer ring to the hub; and a plurality of pairs of strain gauges operatively associated with the plurality of arms for generating signals that are proportional to the force in each one of said arms:

each of said pairs of strain gauges being operatively associated with an associated one of said arms and being arranged circumferentially about said hub to provide signals relating to tension and compression forces experienced by said arms during operation of said vehicle.

2. The force transducer of claim 1 wherein the transducer is formed from high strength steel.

3. The force transducer of claim 2 wherein the high strength steel is Vega A6 tool steel.

4. The force transducer of claim 1 wherein the outer ring is connected to a shock tower.

5. The force transducer of claim 1 wherein the first component is a MacPherson suspension strut.

6. The force transducer of claim 1 wherein the second component is a spring.

7. The force transducer of claim 1 wherein the third component is a jounce bumper.

8. A method of measuring loads imparted to the suspension of a vehicle, comprising the steps of:

receiving a first force from a first component of the suspension with a hub having an aperture;

receiving a second force from a second component of the suspension via a seat connected to the hub;

receiving a third force from a third component of the suspension via a ledge connected to the hub; and measuring the first, second and third forces with a plurality of pairs of strain gauges mounted on a plurality of arms that connect the hub to an outer ring, the strain gauges each producing an output signal that is proportional to a tensile or compressive strain experienced by each of the arms, thereby allowing a measurement of forces imparted to the suspension of the vehicle during operation of said vehicle.

9. The method of claim 8, further comprising the step of generating a calibration curve that is used to convert each of said signals to a force value.

10. The method of claim 8, further comprising the step of mounting the outer ring to a shock tower.

11. The method of claim 8, further comprising the step of connecting a suspension strut rod to the hub, thereby allowing shock absorber forces to be transmitted to the hub for inclusion in load measurements.

12. A force transducer for measuring loads imparted to a suspension of a vehicle, said transducer comprising:

a hub having a means for receiving a plurality of components of a suspension system of said vehicle, said hub being secured to a shock tower of said vehicle;

an outer ring;

a plurality of circumferentially spaced arms for coupling said outer ring to said hub;

a plurality of pairs of strain gauges, with each one of said pairs being associated with one of said arms;

each of said pairs of strain gauges being arranged so as to sense compressive and tensile forces experienced by its associated said arm and to generate a corresponding pair of output signals having a magnitude in relation to said sensed compressive and tensile forces; and a bridge circuit for receiving said output signals and generating an electrical output signal indicative of the forces experienced at said arms while said vehicle is operating.

* * * * *